United States Patent [19]
Plummer

[11] Patent Number: 5,562,431
[45] Date of Patent: Oct. 8, 1996

[54] ISOLATED BACKSTOP FOR FLEXIBLE COMPRESSOR VALVE

[75] Inventor: Darrill L. Plummer, Charlotte, N.C.

[73] Assignee: Ingersoll-Rand Company, Woodcliff Lake, N.J.

[21] Appl. No.: 435,410

[22] Filed: May 10, 1995

[51] Int. Cl.⁶ .............................. F04B 53/10; F16K 15/16
[52] U.S. Cl. .................... 417/569; 417/571; 137/512.15; 137/856
[58] Field of Search ..................................... 417/569, 571; 137/512.15, 856

[56] References Cited

U.S. PATENT DOCUMENTS

| | | |
|---|---|---|
| 1,614,124 | 1/1927 | Hansen . |
| 1,748,531 | 2/1930 | Troup . |
| 2,021,085 | 11/1935 | Orr . |
| 2,118,356 | 5/1938 | Money . |
| 2,752,943 | 7/1956 | Doeg . |
| 3,939,867 | 2/1976 | Lundvik et al. ........................ 137/856 |
| 4,901,760 | 2/1990 | Nagashima . |
| 4,911,614 | 3/1990 | Kawai et al. . |
| 5,265,646 | 11/1993 | Richardson ........................ 137/512.15 |
| 5,390,633 | 2/1995 | Taue . |

FOREIGN PATENT DOCUMENTS 2357899  6/1974  Germany .......................... 137/512.15

*Primary Examiner*—Richard A. Bertsch
*Assistant Examiner*—Roland G. McAndrews, Jr.
*Attorney, Agent, or Firm*—Michael M. Gnibus

[57] ABSTRACT

A compressor including an isolated backstop which reduces the amount of undesirable noise emitted from a compressor during operation. The backstop includes two or more isolating members which isolate the backstop and prevent direct contact between the backstop and the walls of compressor. The isolating members may be elastomeric members or springs.

13 Claims, 5 Drawing Sheets

ISOLATED BACKSTOP FOR FLEXIBLE COMPRESSOR VALVE

BACKGROUND OF THE INVENTION

This invention generally relates to gas compressors having flexible reed or finger valves, and more particularly to gas compressors having backstops for limiting displacement of such valves.

DESCRIPTION OF THE PRIOR ART

Reed or finger valves are used in some air compressors as intake and exhaust valves to produce unidirectional airflow through the compressor. Such valves have a relatively thin valve body which is made from a flexible spring steel. During operation of the compressor, the fingers continuously flex between open and closed positions.

As gas, typically air, is drawn through the compressor intake port into the compression chamber, the fingers at the compression chamber discharge ports are closed and block the discharge ports to prevent backflow of compressed gas previously expelled from the compression chamber, and the fingers at the compression chamber inlet ports are impacted upon by the drawn gas and opened a predetermined distance to permit gas to flow into the compression chamber. When not impacted upon by the drawn gas, the fingers seal the compression chamber inlet ports.

As compressed gas is expelled from the compression chamber, the fingers at the compression chamber inlet ports are closed to prevent backleak of gas back through the inlet ports and thereby ensure that the compressed gas flows only out the discharge ports. The fingers at the compression chamber discharge ports are impacted upon by the compressed gas and flexed open a predetermined distance to permit the compressed gas to flow out of the compression chamber.

Typically, the finger or reed valves include a first end fixedly clamped to a valve plate and a second movable end that is flexed between the open and closed positions. Opening of the valves is limited solely by a backstop that is provided proximate the movable end of the fingers. The backstop serves to limit the movement of the movable end of the fingers when the fingers are impacted upon by gas flowing through the ports provided in the valve plate. Conventional backstops are usually integral with the compressor and are formed in a wall of a component of the compressor, such as a cylinder head, valve plate or combustion chamber. However rigid backstop plates made integral with the compressor may also be used. Conventional backstops are usually made from metal.

During operation of a compressor, opening and closing of the reed or finger valves occurs at a high frequency. Each time the valves are opened, the movable end of each finger impacts the metal backstop. This frequent metal-to-metal contact between the movable ends of the fingers and the backstop produces a large amount of undesirable noise that is transmitted in sound waves from the integral backstop and out of the compressor inlet, compressed air discharge conduits, radiates from the structure. The undesirable compressor noise can be heard by a person near the operating compressor.

The foregoing illustrates a limitation known to exist in present compressors designs. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a isolated backstop in a gas compressor having interior walls where the compressor includes a valve plate with at least one port adapted to accommodate the flow of gas through the plate, at least one flexible valve having a first end fixed to the valve plate and a second end movable toward and away from the plate, at least one backstop adjacent the second end of the valve, and wherein the backstop includes a contact surface for impeding movement of the second end of the valve away from the plate, and a backstop isolating means for isolating the backstop and preventing direct contact between the compressor walls and the backstop.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION OF THE PREFERRED EMBODIMENTS

Figure 2:
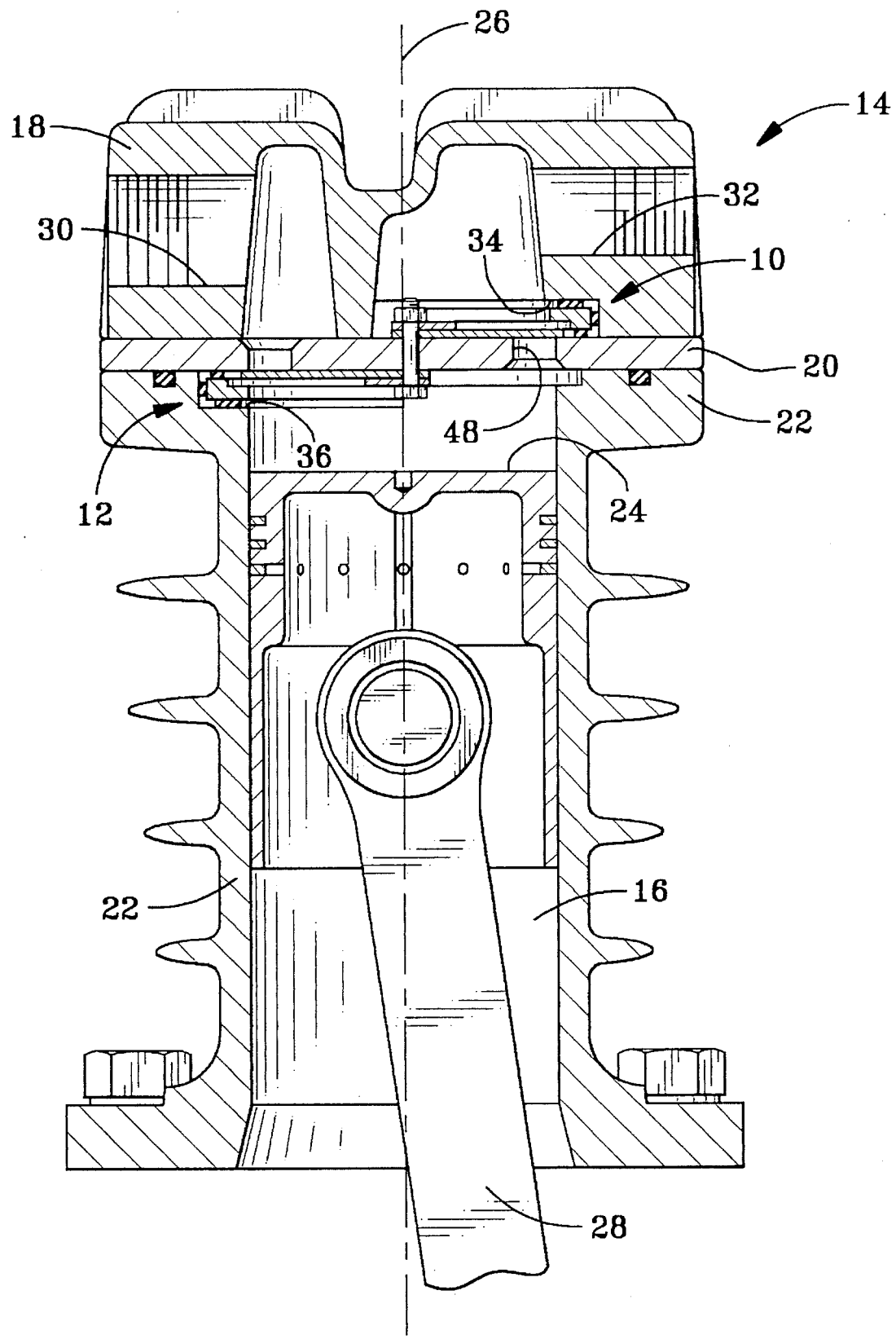
FIG. 2 is an axial cross section taken along line 2—2 of FIG. 1 through a piston-type air compressor that includes the present invention.

Referring now to the drawings, wherein similar reference characters designate corresponding parts throughout the several views, FIG. 2 illustrates at 10 and 12 the backstop members of the first embodiment of the invention mounted for use in a reciprocating, piston-type compressor 14. It should be understood that although the backstop is described herein for use with a piston-type reciprocating compressor, the backstop may also be employed with other compressors which use flexible reed or finger valves as exhaust or intake valves.

The compressor includes compression chamber 16, cylinder head 18, and valve plate 20, sandwiched between the cylinder head and the compression chamber wall 22. The compression chamber is defined along the sides by chamber walls 22 and along the top by valve plate 20. Conventional piston 24 is located in chamber 16 and is adapted to move linearly in the chamber along axis 26 toward and away from the valve plate in a reciprocating manner to thereby compress gas in the chamber. Connecting rod 28 joins the piston to a conventional drive member such as a crankshaft, to thereby produce the reciprocating linear displacement of the piston in the chamber.

Cylinder head 18 includes intake port 30 for drawing gas, usually air into the compression chamber 16, discharge port 32 for expelling compressed gas from the compressor, and first opening 34 formed on bottom of the cylinder head inner wall adjacent the discharge port and valve plate.

Figure 1:
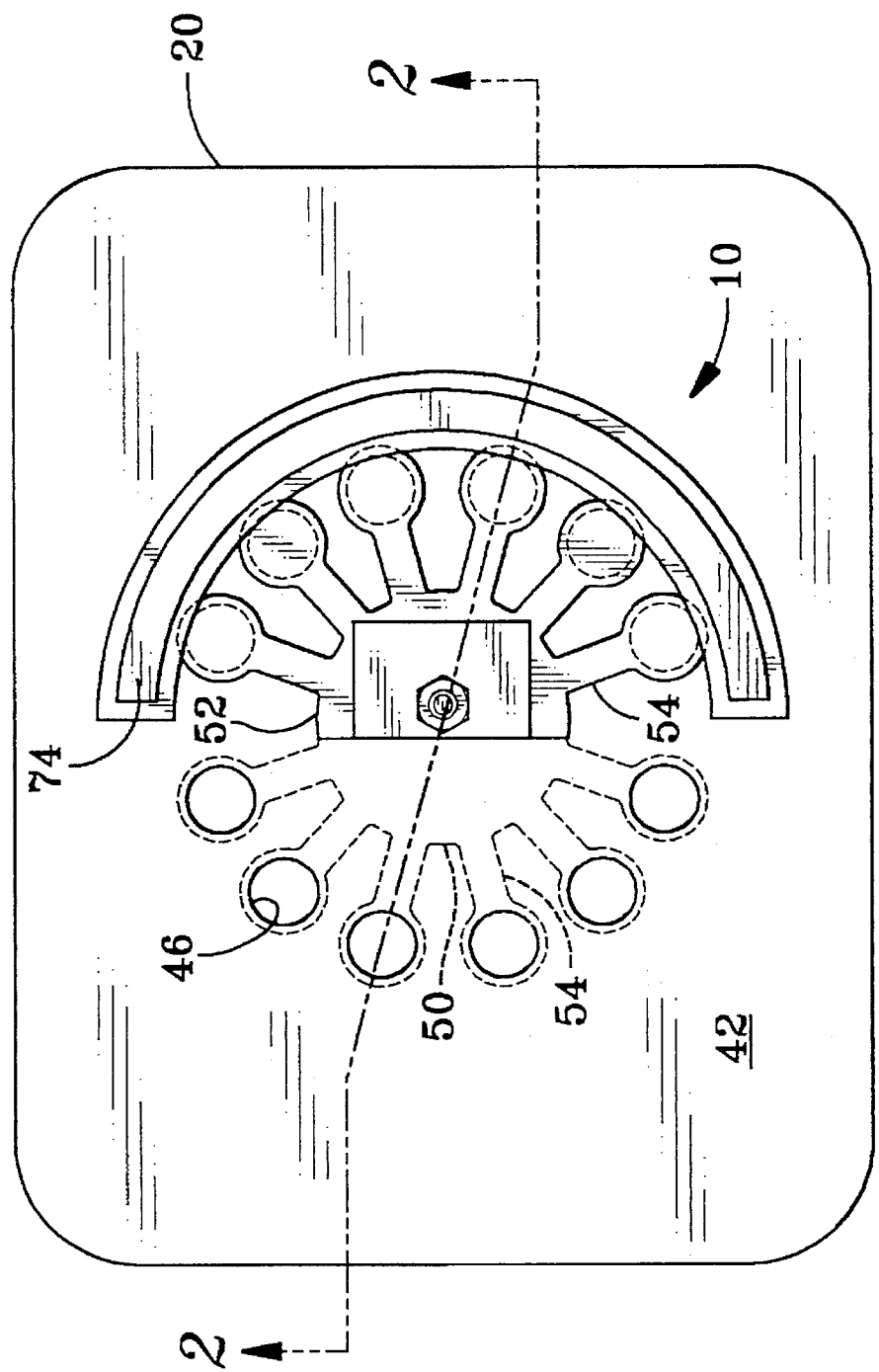
FIG. 1 is a top view of a valve plate illustrating an embodiment of the present invention.
Figure 3:
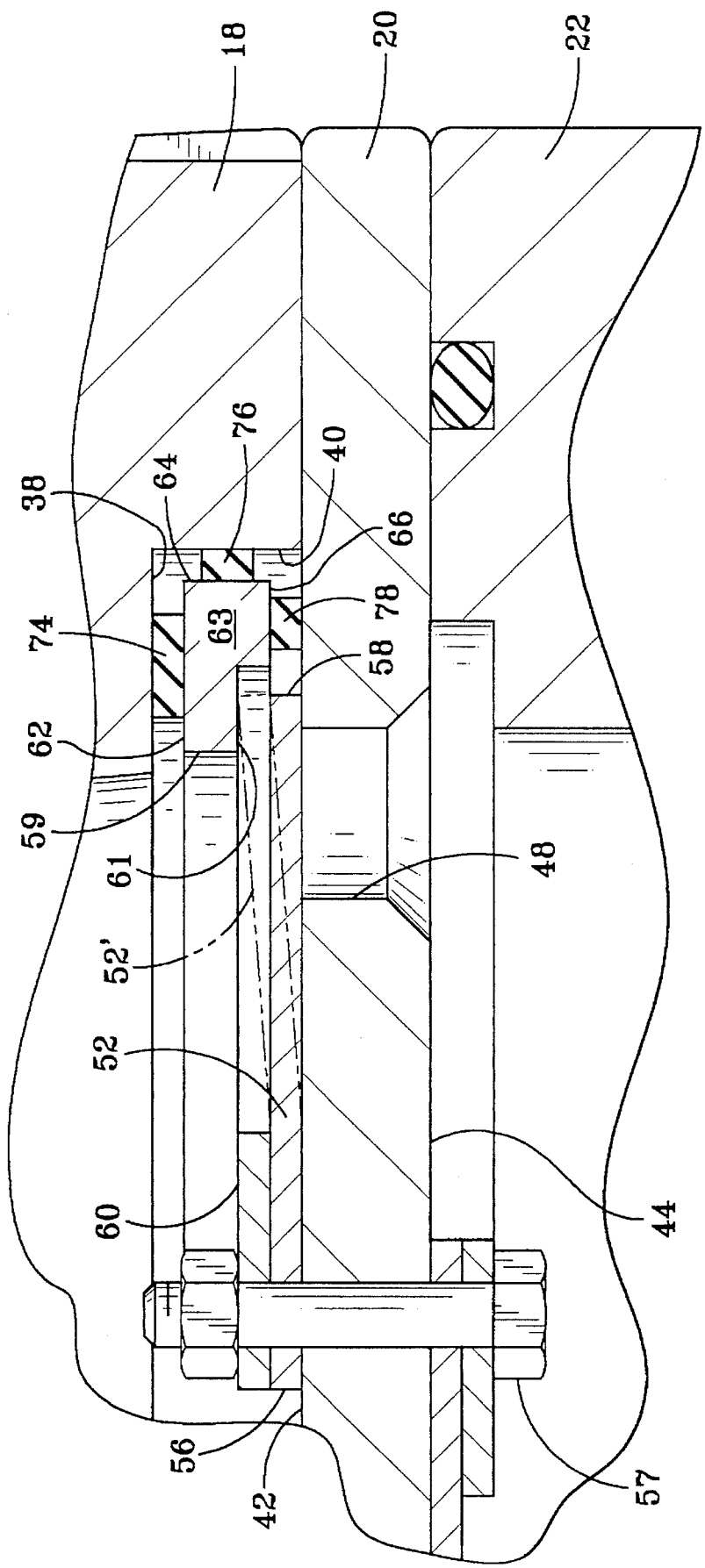
FIG. 3 is an enlarged view of the sectional view of FIG. 2 illustrating a closed reed valve and also illustrating an open reed valve in phantom.

A second opening 36, like first opening 34 is formed in the top of compression chamber wall 22 adjacent compression chamber 16. Both of the openings are shown in FIG. 2. Each of the openings has an arcuate shape similar to the arcuate shape of backstop 12 as shown in FIG. 1. Additionally, each of the openings has a first surface 38 and a second surface 40 as shown in FIG. 3. The backstops 10 and 12 are adapted to be positioned in the openings so that backstops are isolated and are not in direct contact with any portion of the first and second opening surfaces.

Valve plate 20 is generally planar and has first and second outer surfaces 42 and 44 and at least one and may have a plurality of inlet and discharge ports 46 and 48 respectively, which extend through the valve plate surfaces. In the preferred embodiment, both the inlet and discharge ports are arranged in separate, arcuate arrays as shown in FIG. 1.

Reed or finger valves 50 and 52 are located on outer surfaces 42 and 44 respectively of valve plate 20. The valves are quite flexible and are made from a flexible spring steel. The valve bodies are essentially the same, so that as the description proceeds, only reed valve 52 will be described. Reed valve 52 includes at least one but preferably a plurality of fingers 54 corresponding to the number of discharge ports 48 provided in the valve plate. The reed valve 52 includes one finger for each discharge port. As shown in FIG. 1, the fingers are arranged in an arcuate array like the array configuration of discharge ports 48. The reed valve has a first fixed end 56, fixed to surface 42 by fastener 57 such as a bolt or other suitable threaded fastener, and also includes a movable end 58. The movable end is movable toward and away from the valve plate during operation of compressor 14. Securing plate 60 is sandwiched between the fastener nut and the fixed end of the valve and maintains the fixed end of the reed valve against the plate surface 42 to promote flexing of solely the movable end during operation of compressor 14.

Now turning to the backstops of the present embodiment of the invention, as best illustrated in FIG. 1, both the backstop members 10 and 12 are arcuate and are made from metal such as aluminum, cast iron, steel, powder metal. However, the backstops may also be made from other suitable materials, such as other metals or plastics. In the preferred embodiment, the backstops are shown having an arcuate configuration similar to the arcuate configuration of the array of fingers of each reed valve. However, it should be understood that if the array of the fingers was not arcuate, the shape of the backstop member could be altered to approach new finger array shape in the same way the arcuate backstop of the present invention is similar in shape to the array of fingers 54. The backstops and openings are the same so that as the description proceeds, only the backstop and opening associated with valve plate discharge ports will be described.

Backstop 12 has a body which includes contact member 59, leg member 63 extending downward from the contact member, a contact surface 61 on one side of the contact member and first, second and third backstop surfaces 62, 64 and 66 along another side of the leg and contact member and opposite the contact surface side. When the backstop is positioned in the desired location in the opening, the first and second backstop surfaces respectively face the first and second opening surfaces 38 and 40, the third surface faces outer surface 42 of valve plate 20 and contact surface 61 is a predetermined distance from movable ends 58 of the fingers of reed valve 52 so that during operation of the compressor when the valve is opened, the movable ends of the fingers come in contact with the contact surface of the backstop as shown in phantom generally at 52' in FIG. 3.

Backstop 12 is isolated from direct contact with opening surfaces 38 and 40 and valve plate outer surface 42 by first, second and third isolating members 74, 76 and 78 respectively which are adapted to be compressively fitted between a pair of adjacent surfaces. Each isolating member is made from an elastomeric material, typically rubber but also may be silicone.

As shown clearest in FIG. 1, first isolating member 74 is arcuate, like backstop 12 and is compressively fitted between first surface 62 and first opening surface 38. Second isolating member 76 is compressively fitted between second surface 64 and second opening surface 40. Third isolating member 78 is arcuate like backstop 12 and is compressively fitted between third surface 66 and valve plate outer surface 42. In this way, the backstop 12 is maintained in the required position in opening 34, isolated from direct contact with cylinder head 18 and valve plate 20, during operation of compressor 14.

Backstop 12 adjacent inlet ports 46 is isolated from direct contact with the compression chamber walls and valve plate by the other similar isolating members.

In an embodiment other than the present preferred embodiment of the invention, slots adapted to receive an isolating member may be formed in the surfaces of the backstop member with each isolating member sandwiched between a slot and an adjacent surface.

In operation, isolated backstop 12, limits the outward transmission of much of noise produced by metal-to-metal contact between the backstop 12 and the fingers 54 of reed valve 52. Air is drawn into compressor 14 through intake port 30 and valve plate inlet ports 46. The air impacts upon the movable ends of fingers 54 of reed valve 50 and thereby opens the valve by moving the fingers away from the ports. The fingers are opened a predetermined distance, until the movable ends contact the contact surface 61 of inlet backstop 12. This contact produces noise that is transmitted in wave form, through the backstop to the isolating members 74, 76 and 78. The isolating members absorb the sound waves preventing further transmission of the waves to the compression chamber walls, and thereby preventing outward displacement of the sound waves. In this way, the amount of objectionable noise heard by one near an operating compressor is reduced.

After the gas is compressed in compression chamber 16 by piston 24, the compressed gas is expelled through valve plate discharge ports 48 and compressor discharge port 32. The gas impacts upon the movable ends of fingers 54 of reed valve 52 as the gas is expelled out the compression chamber, and thereby opens the fingers a predetermined distance until the movable ends contact backstop 10. This contact is the same as the contact herein discussed between inlet fingers and inlet backstop 12, and is illustrated in phantom as 52' in FIG. 3. The noise produced by the contact is transmitted in wave form through the backstop to the isolating members where it is absorbed in the manner previously described.

Figure 4:
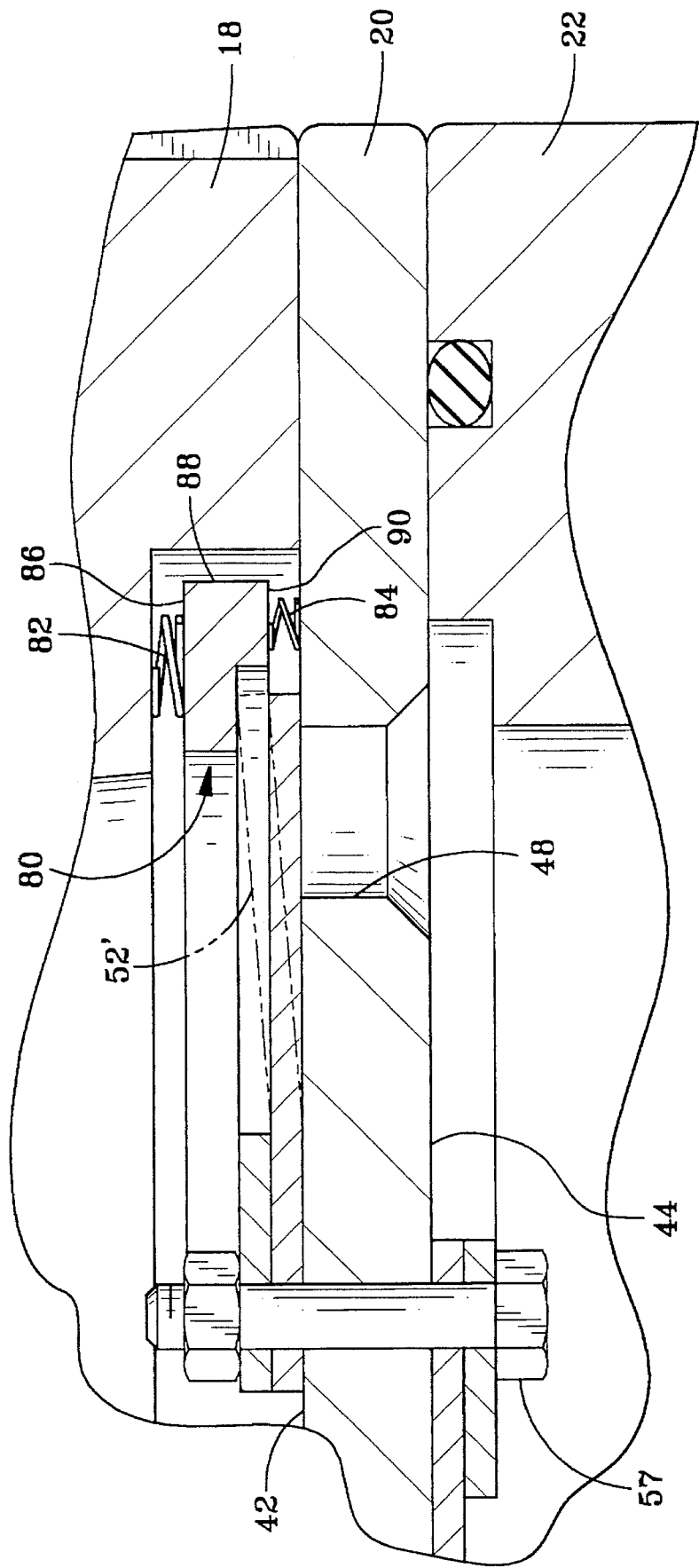
FIG. 4 is an enlarged view of the sectional view of FIG. 2, illustrating an alternative embodiment of the present invention.
Figure 5:
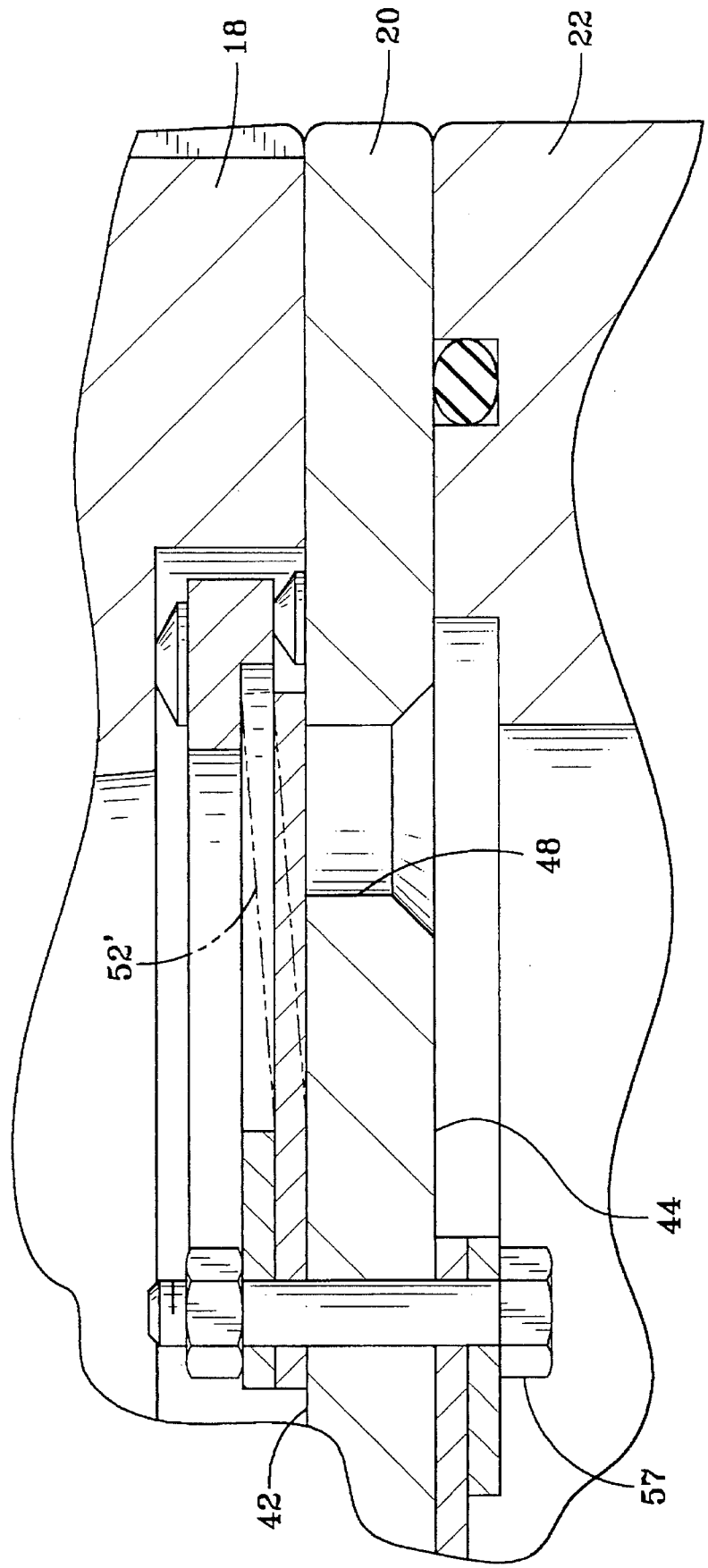
FIG. 5 is an enlarged view of the sectional view of FIG. 2, illustrating an alternative embodiment of the present invention.

An alternate embodiment of the present invention is illustrated in FIG. 4 wherein first and second springs 82 and 84 are used to isolate backstop 80. The compressor 14, cylinder head 18, compression chamber 16, valve plate 20 reed valves 50 and 52 are the same as described in the first embodiment of the present invention. Additionally, inlet and discharge ports 46 and 48 in valve plate 20 are arranged in an arcuate array. Openings 34 and 36 are formed in cylinder head 18 and compression chamber walls 22.

Backstop 80 located near discharge ports 48, is similar to backstops 10 and 12. Just as backstop 10 is located adjacent the inlet ports in the first embodiment, an inlet backstop (not shown) like backstop 80 is provided adjacent the inlet ports 46, however as the description of the alternative embodiment proceeds only the backstop 80 will be described.

Discharge backstop 80 is arcuate and is adapted to be positioned in arcuate opening 34 as previously described. If the ports were not arranged in an arcuate array, the backstop 80 could be changed to the appropriate array shape in the same way the arcuate backstop of the present invention is similar in shape to the array of fingers 54. The backstop includes contact surface 61, first backstop surface 86, second backstop surface 88 and third backstop surface 90, like backstop surfaces 62, 64, and 66. When the backstop is located in the opening, first backstop surface 86 faces first opening surface 38, second backstop surface 80 faces second opening surface 40 and third surface 90 faces valve plate outer surface 42.

At least one but preferably more than one spring is compressively fitted between the adjacent surfaces as shown in FIG. 4. Springs 82 are compressed between surface 96 and surface 38 and springs 84 are compressed between surface 90 and surface 42. Second backstop surface 88 is parallel to and proximate opening surface 40 when the backstop 80 is positioned in opening 34. In this way, backstop 80 is isolated from direct contact with compressor cylinder head 18 and valve plate 20. In the same way inlet backstop (not shown) is isolated from the compression chamber wall.

The springs should have a relatively small spring stiffness factor however the springs should be of a sufficient stiffness to maintain the backstop in the required location in opening 34 during operation of the compressor 14. The spring members may be coil springs, bellville springs or wave springs.

In operation, reed valve 52 is opened and closed continuously during compression cycle of compressor 14. As the valves are opened a predetermined distance, the fingers contact the backstop in the manner previously described and produce a relatively large amount of undesirable noise which is transmitted through the backstop 80. By isolating the backstop from direct contact with the compressor head and valve plate, it is believed that a significant portion of the transmitted noise is not transmitted out the compressor and heard by one near the operating compressor.

While I have illustrated and described a preferred embodiment of the invention, it is understood that this is capable of modification, and I therefore do not wish to be limited to the precise details set forth, but desire to avail myself of such changes and alterations as fall within the purview of the following claims.

Having described the invention, what is claimed is:

1. In a gas compressor having a compressor wall, a valve plate with at least one port adapted to accommodate the flow of gas through the plate, at least one flexible valve, said valve having a first end fixed to the valve plate and a second end movable toward and away from said valve plate and at least one backstop for limiting the movement of the second end away from said valve plate, said at least one backstop comprising;

a) a body located within the compressor wall having a contact member located a predetermined distance from said second end; and b) backstop isolating means for isolating said backstop from direct contact with the compressor wall and valve plate.

2. A compressor as claimed in claim 1, wherein the backstop is arcuate.

3. A backstop as claimed in claim 1 wherein the backstop body is comprised of a leg and a contact member.

4. A backstop as claimed in claim 1 wherein the backstop includes a first backstop surface, a second backstop surface and a third backstop surface, and wherein said isolating means comprises first, second and third isolating members, said first isolating member adapted to be compressively fitted between said first surface and said compressor wall, said second isolating member adapted to be fitted between said second backstop surface and said compressor wall and said third isolating member adapted to be compressively fitted between said third backstop surface and said valve plate.

5. A backstop as claimed in claim 4 wherein the first, second, and third isolating members are made from an elastomer.

6. A backstop as claimed in claim 1, wherein the backstop includes a first backstop surface and a second backstop surface and wherein said isolating means includes at least one first spring member adapted to be compressively fitted between said first backstop surface and said compressor wall and at least one second spring member adapted to be compressively fitted between said second backstop surface and said valve plate.

7. A compressor as claimed in claim 6, wherein said at least one first spring and said at least one second spring are coil springs.

8. A compressor as claimed in claim 6, wherein said at least one first spring and said at least one second spring are bellville springs.

9. A compressor as claimed in claim 6, wherein the backstop is arcuate.

10. In a compressor having a cylinder head with a cylinder head wall with an opening having a surface in said wall, a compression chamber wall with an opening having a surface in said chamber wall, a compressor valve plate having at least one inlet port and at least one discharge port, at least one first flexible valve adjacent the at least one inlet port, at least one second flexible valve adjacent the at least one discharge port, each of said flexible valves including a first end fixed to the valve plate and a second end movable toward and away from the valve plate, a first backstop member located in said compression chamber opening adjacent said second end of said first valve, and a second backstop member located in said head opening adjacent said second end of said second valve, said first and second backstops comprising:

a) a body, a contact surface on a first side of said body;

b) backstop isolating means for isolating the first and second backstops and preventing direct contact between the first and second backstops and the compressor.

11. A compressor as claimed in claim 10, wherein the isolating means is at least one spring.

12. A compressor as claimed in claim 10 wherein the first and second backstops each include a second body side, first, second, and third surfaces along said second body side and wherein said backstop isolating means includes isolating members adapted to be fitted between the first, second and third backstop surfaces and the compressor.

13. A compressor, as claimed in claim 12, wherein said isolating members are made from an elastomer.

* * * * *